US012789593B2

(12) United States Patent
Shimomura et al.

(10) Patent No.: US 12,789,593 B2
(45) Date of Patent: Nov. 10, 2026

(54) WINDSHIELD

(71) Applicant: NIPPON SHEET GLASS COMPANY, LIMITED, Tokyo (JP)

(72) Inventors: Takahiro Shimomura, Tokyo (JP); Kenshu Ando, Tokyo (JP); Hirofumi Hotta, Tokyo (JP)

(73) Assignee: NIPPON SHEET GLASS COMPANY, LIMITED, Tokyo (JP)

( * ) Notice: Subject to any disclaimer, the term of this patent is extended or adjusted under 35 U.S.C. 154(b) by 289 days.

(21) Appl. No.: 18/573,707

(22) PCT Filed: Jun. 24, 2022

(86) PCT No.: PCT/JP2022/025396
§ 371 (c)(1),
(2) Date: Dec. 22, 2023

(87) PCT Pub. No.: WO2022/270634
PCT Pub. Date: Dec. 29, 2022

(65) Prior Publication Data

US 2024/0286463 A1 Aug. 29, 2024

(30) Foreign Application Priority Data

Jun. 24, 2021 (JP) ................................ 2021-105262

(51) Int. Cl.
*B60J 1/02* (2006.01)
*B32B 7/02* (2019.01)
(Continued)

(52) U.S. Cl.
CPC .................. *B60J 1/02* (2013.01); *B32B 7/02* (2013.01); *B32B 7/022* (2019.01);
(Continued)

(58) Field of Classification Search
CPC ...................................... B32B 17/00–17/1099
See application file for complete search history.

(56) References Cited

U.S. PATENT DOCUMENTS

2005/0175844 A1 8/2005 Kramling et al.
2006/0138798 A1 6/2006 Oehrlein
(Continued)

FOREIGN PATENT DOCUMENTS

EP 1 613 561 B1 12/2006
EP 4 098 439 A1 12/2022
(Continued)

OTHER PUBLICATIONS

International Search Report, issued in PCT/JP2022/025396, PCT/ISA/210, dated Sep. 6, 2022.
(Continued)

*Primary Examiner* — Prashant J Khatri
(74) *Attorney, Agent, or Firm* — Birch, Stewart, Kolasch & Birch, LLP

(57) ABSTRACT

This windshield comprises: a first glass panel having a first surface and a second surface; a second glass panel having a third surface and a fourth surface; and an intermediate film that is disposed between the first glass panel and the second glass panel, and that joins the second surface of the first glass panel to the third surface of the second glass panel. The failure stress of at least one region of the glass panel which is the inner panel is configured so as to be less than the failure stress of another region.

19 Claims, 6 Drawing Sheets

(51) Int. Cl.
*B32B 7/022* (2019.01)
*B32B 17/10* (2006.01)
*B60J 1/00* (2006.01)

(52) U.S. Cl.
CPC .. *B32B 17/10036* (2013.01); *B32B 17/10761* (2013.01); *B60J 1/001* (2013.01); *B32B 2307/538* (2013.01); *B32B 2307/552* (2013.01); *B32B 2307/7376* (2023.05); *B32B 2605/08* (2013.01)

(56) References Cited

U.S. PATENT DOCUMENTS

| | | | | |
|---|---|---|---|---|
| 2016/0354996 | A1* | 12/2016 | Alder | C03C 3/091 |
| 2017/0241195 | A1* | 8/2017 | Ota | B32B 17/1066 |
| 2022/0279651 | A1 | 9/2022 | Maniwa et al. | |
| 2022/0355653 | A1 | 11/2022 | Nagai et al. | |

FOREIGN PATENT DOCUMENTS

| | | | | |
|---|---|---|---|---|
| JP | 2-37025 | A | 2/1990 | |
| JP | 2005-535545 | A | 11/2005 | |
| JP | 2007-101134 | A | 4/2007 | |
| JP | 2007-146458 | A | 6/2007 | |
| JP | 2017-190269 | A | 10/2017 | |
| JP | 2019-119624 | A | 7/2019 | |
| JP | 2020-172403 | A | 10/2020 | |
| JP | 2020-172404 | A | 10/2020 | |
| JP | 2021-82688 | A | 5/2021 | |
| WO | WO 2019/245819 | A1 | 12/2019 | |
| WO | WO-2021180956 | A1 * | 9/2021 | B32B 17/10036 |

OTHER PUBLICATIONS

Written Opinion of the International Searching Authority, issued in PCT/JP2022/025396, PCT/ISA/237, dated Sep. 6, 2022.

Extended European Search Report for European Application No. 22828550.8, dated May 23, 2025.

Chinese Office Action and Search Report for Chinese Application No. 202280044712.6, dated Mar. 16, 2026, with English translation of the Office Action.

Japanese Office Action for Japanese Application No. 2023-530150, dated Feb. 10, 2026, with English translation.

* cited by examiner

WINDSHIELD

TECHNICAL FIELD

The present invention relates to a windshield.

BACKGROUND ART

Windshields of automobiles are designed to have high rigidity, for example, for countermeasures against chipping (see, for example, paragraph 0018 of Patent Document 1).

PRIOR ART DOCUMENT

Patent Document

Patent Document 1: Japanese Patent Laid-open Publication No. 2007-146458

SUMMARY OF THE INVENTION

Problems to be Solved by the Invention

However, when the rigidity of a windshield is increased, it becomes a countermeasure against chipping, but for example, when an automobile collides with a pedestrian and the pedestrian collides with the windshield, there is a problem that an increased impact is applied to the pedestrian. The present invention has been made to solve the above problems, and an object of the present invention is to provide a windshield that can be easily cracked when a heavy object such as a pedestrian collides with the windshield.

Means for Solving the Problems

Item 1. A windshield comprising:

a first glass sheet having a first surface and a second surface;

a second glass sheet having a third surface and a fourth surface; and an intermediate film disposed between the first glass sheet and the second glass sheet and joining the second surface of the first glass sheet and the third surface of the second glass sheet to each other;

wherein a fracture stress of at least a partial region of the inner glass sheet is smaller than a fracture stress of another region.

Item 2. The windshield according to Item 1, wherein an easily breaking means is provided in the partial region.

Item 3. The windshield according to Item 2, wherein the easily breaking means is provided on the fourth surface.

Item 4. The windshield according to Item 2 or 3, wherein the first glass sheet is not provided with the easily breaking means.

Item 5. The windshield according to any one of Items 1 to 4, wherein the windshield is provided behind an engine hood of a vehicle, and the partial region faces the engine hood.

Item 6. The windshield according to any one of Items 1 to 4, wherein the windshield is provided behind a cowl louver, and the partial region faces the cowl louver.

Item 7. The windshield according to any one of Items 1 to 6, further comprising a shielding layer laminated on at least the second glass sheet, wherein the other region is provided in the second glass sheet, and a thickness of the shielding layer laminated on the partial region is larger than a thickness of the shielding layer laminated on the other region.

Item 8. The windshield according to any one of Items 1 to 6, further comprising shielding layers laminated on the first glass sheet and the second glass sheet, respectively, wherein the other region is provided in the first glass sheet, and a thickness of the shielding layer laminated on the second glass sheet is larger than a thickness of the shielding layer laminated on the first glass sheet.

Item 9. The windshield according to any one of Items 1 to 8, wherein the fracture stress in the partial region is 60 MPa or less.

Item 10. The windshield according to any one of Items 1 to 6, wherein the partial region is altered by a laser.

Item 11. The windshield according to any one of Items 1 to 6, wherein a surface of the partial region is altered by sandblasting.

Item 12. The windshield according to any one of Items 1 to 6, wherein a surface roughness of the partial region is larger than a surface roughness of the other region.

Item 13. The windshield according to any one of Items 1 to 6, wherein the intermediate film is not disposed between the first glass sheet and the second glass sheet at a place corresponding to the partial region.

Item 14. The windshield according to any one of Items 1 to 6, wherein the intermediate film has a striking region at a place corresponding to the partial region, and the region to be struck is provided with a striking member that crushes the second glass sheet.

Item 15. The windshield according to Item 7, wherein the shielding layer is laminated on at least one of the third surface and the fourth surface of the second glass sheet.

Item 16. The windshield according to Item 8, wherein the shielding layers are laminated on at least one of the first surface and the second surface of the first glass sheet.

Item 17. The windshield according to any one of Items 8 to 16, wherein the shielding layer is laminated on at least one of the third surface and the fourth surface of the second glass sheet.

Item 18. The windshield according to any one of Items 1 to 17, wherein the first glass sheet has a thickness of 1 mm or more and 4 mm or less.

Item 19. The windshield according to any one of Items 1 to 18, wherein the second glass sheet has a thickness of 0.4 mm or more and 4 mm or less.

Item 20. The windshield according to any one of Items 1 to 19, wherein the first glass sheet is a glass sheet to be disposed on a vehicle exterior side, and the second glass sheet is a glass sheet to be disposed a vehicle interior side.

Item 21. The windshield according to any one of Items 1 to 19, wherein the first glass sheet is a glass sheet to be disposed on a vehicle interior side, and the second glass sheet is a glass sheet to be disposed a vehicle exterior side.

Advantages of the Invention

By the present invention, a windshield can be made easy to crack when an object having a large weight such as a pedestrian collides therewith.

EMBODIMENTS OF THE INVENTION

Figure 1:
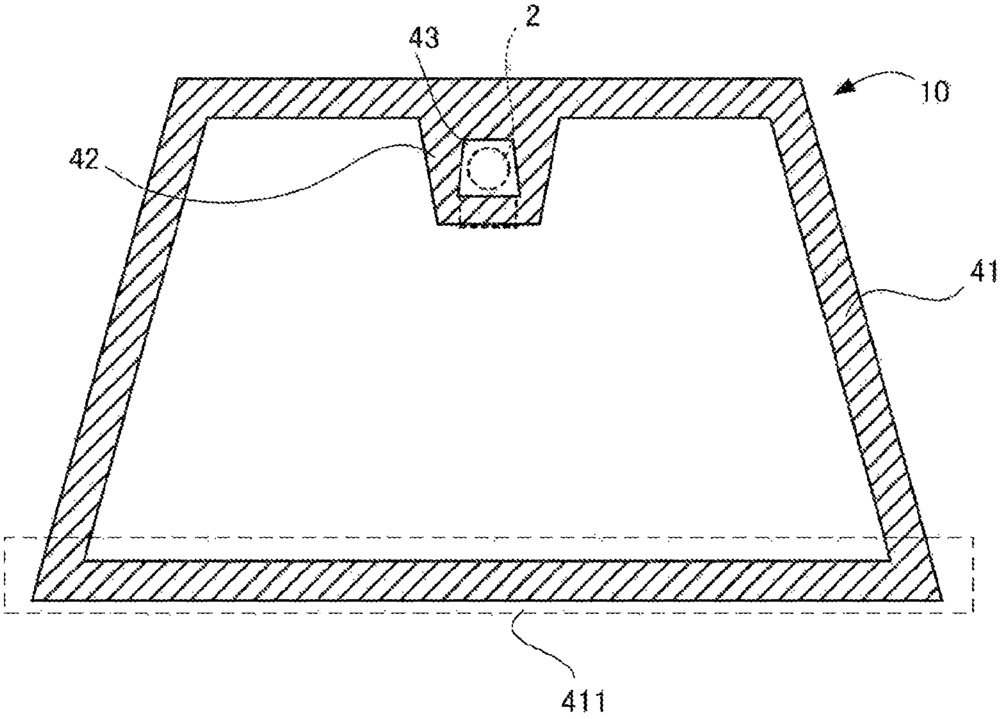
FIG. 1 is a plan view illustrating one embodiment of the windshield according to the present invention.
Figure 2:
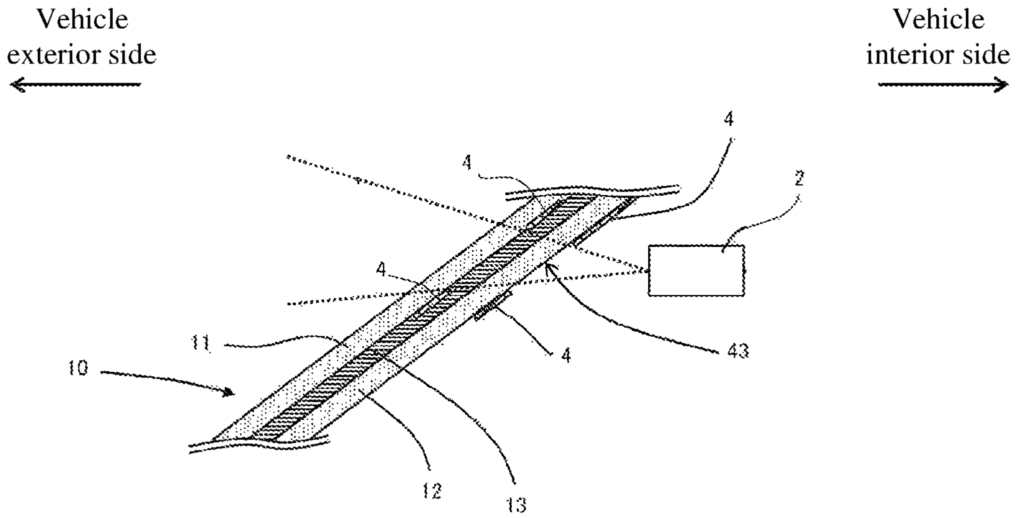
FIG. 2 is a sectional view of FIG. 1.

First, a configuration of a windshield according to the present embodiment will be described with reference to FIGS. 1 and 2. FIG. 1 is a plan view of a windshield, and FIG. 2 is a sectional view of FIG. 1. Note that the up-down direction in FIG. 1 is referred to as "upper and lower", "perpendicular", or "vertical", and the left-right direction in FIG. 1 is referred to as "horizontal", for convenience of description. FIG. 1 illustrates a windshield viewed from the vehicle interior side. That is, the back side of the drawing of FIG. 1 is the vehicle exterior side, and the front side of the drawing of FIG. 1 is the vehicle interior side.

The windshield includes a trapezoidal laminated glass 10, and is installed on a vehicle body in an inclined state. The laminated glass 10 includes a first glass sheet 11 (the surface on a vehicle exterior side is a first surface, and the surface on a vehicle interior side is a second surface), a second glass sheet 12 (the surface on the vehicle exterior side is a third surface, and the surface on the vehicle interior side is a fourth surface), and an intermediate film 13 disposed therebetween. A shielding layer 4 is laminated on each of the surface on the vehicle interior side (the second surface) of the first glass sheet 11 and the surface on the vehicle interior side (the fourth surface) of the second glass sheet 12, and the shielding layer 4 shields a field of view from the vehicle exterior. An opening 43 is formed in the shielding layer 4, and a situation of the vehicle exterior can be photographed through the opening 43 by a photographing device 2 disposed in the vehicle. That is, the opening 43 constitutes a shooting window. Further, a frame-shaped bracket (not illustrated) is fixed on the shielding layer 4 of the second glass sheet 12, and the photographing device 2 is attached to the bracket. Since the bracket is formed in a frame shape and fixed on the shielding layer 4, the bracket is not visible from the outside of the vehicle. Hereinafter, each constituent element will be described in detail.

<1. Laminated Glass>

Figure 3:
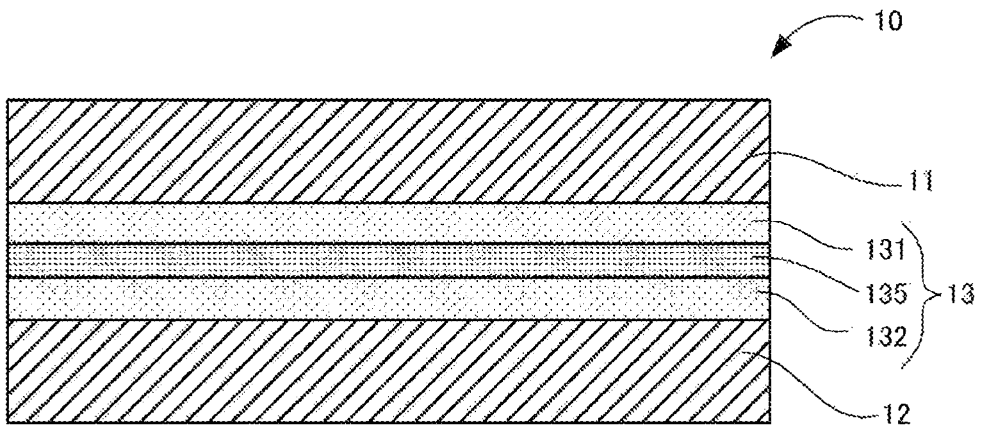
FIG. 3 is a sectional view of a laminated glass.

FIG. 3 is a sectional view of a laminated glass. As illustrated in the drawing, the laminated glass 10 includes a first glass sheet 11 and a second glass sheet 12, and an intermediate film 13 made of resin is disposed between the glass sheets 11 and 12. Hereinafter, these configurations will be described.

<1-1. Glass Sheet>

First, the first glass sheet 11 and the second glass sheet 12 will be described. Known glass sheets can be used as the first glass sheet 11 and the second glass sheet 12, and the first glass sheet and the second glass sheet can also be formed of heat-ray absorbing glass, regular clear glass or green glass, or UV green glass. However, the glass sheets 11 and 12 are required to attain a visible light transmittance that conforms to the safety standards of a country in which automobiles are used. For example, an adjustment may be made such that the first glass sheet 11 ensures a required solar absorptance and the second glass sheet 12 provides a visible light transmittance that meets the safety standards. Hereinafter, examples of clear glass, heat-ray absorbing glass, and soda-lime based glass will be shown.

(Clear Glass)

$SiO_2$: 70 to 73 mass %

$Al_2O_3$: 0.6 to 2.4 mass %

CaO: 7 to 12 mass %

MgO: 1.0 to 4.5 mass %

$R_2O$: 13 to 15 mass % (R is an alkali metal)

Total iron oxide ($T\text{-}Fe_2O_3$) in terms of $Fe_2O_3$: 0.08 to 0.14 mass %

(Heat-Ray Absorbing Glass)

The composition of the heat-ray absorbing glass may be, for example, a composition obtained on the basis of the composition of the clear glass by setting the ratio of the total iron oxide ($T\text{-}Fe_2O_3$) in terms of $Fe_2O_3$ to 0.4 to 1.3 mass %, the ratio of $CeO_2$ to 0 to 2 mass %, the ratio of $TiO_2$ to 0 to 0.5 mass %, and reducing the skeletal components (mainly $SiO_2$ and $Al_2O_3$) of the glass by increase amounts of $T\text{-}Fe_2O_3$, $CeO_2$, and $TiO_2$.

(Soda-Lime Based Glass)

$SiO_2$: 65 to 80 mass %

$Al_2O_3$: 0 to 5 mass %

CaO: 5 to 15 mass %

MgO: 2% by mass or more

NaO: 10 to 18 mass %

$K_2O$: 0 to 5 mass %

MgO+CaO: 5 to 15 mass %

$Na_2O+K_2O$: 10 to 20 mass %

$SO_3$: 0.05 to 0.3 mass %

$B_2O_3$: 0 to 5 mass %

Total iron oxide ($T\text{-}Fe_2O_3$) in terms of $Fe_2O_3$: 0.02 to 0.03 mass %

The thickness of the laminated glass 10 according to the present embodiment is not particularly limited, but the total thickness of the first glass sheet 11 and the second glass sheet 12 may be set to, for example, 2.1 to 6 mm, and from the viewpoint of weight reduction, the total thickness of the first glass sheet 11 and the second glass sheet 12 is preferably set to 2.4 to 3.8 mm, more preferably 2.6 to 3.4 mm, and particularly preferably 2.7 to 3.2 mm. As described above, since it is necessary to reduce the total thickness of first glass sheet 11 and second glass sheet 12 in order to reduce the weight, the thicknesses of first glass sheet 11 and second glass sheet 12 can be determined as follows, although the thickness of each glass sheet is not particularly limited.

The first glass sheet 11 is mainly required to have durability and impact resistance against extremal obstacles, and is required as a windshield of an automobile to have impact resistance against a flying object such as a pebble. On the other hand, as the thickness increases, the weight increases, which is undesirable. From this viewpoint, the thickness of the first glass sheet 11 is preferably 1.0 to 4.0 mm, more preferably 1.8 to 2.3 mm, and still more preferably 1.9 to 2.1 mm. What thickness is adopted may be determined according to the intended application of glass.

The thickness of the second glass sheet 12 may be made equal to that of the first glass sheet 11, but for example, the thickness may be made smaller than that of the first glass sheet 11 in order to reduce the weight of the laminated glass 10. Specifically, in consideration of the strength of glass, the thickness of the second glass sheet is preferably set to 0.4 to 4.0 mm, more preferably 0.6 to 2.0 mm, still more preferably 0.8 to 1.6 mm, and particularly preferably 1.0 to 1.4 mm. Furthermore, it is preferably 0.8 to 1.3 mm. With regard to the second glass sheet 12 as well, what thickness is adopted may be determined according to the intended application of glass.

Here, one example of a method of measuring the thickness when the glass sheet (laminated glass) is curved will be described. First, the measurement positions are two positions, namely, an upper position and a lower position on a center line S extending vertically at the horizontal center of the glass sheet. The measuring device is not particularly limited, and for example, a thickness gauge such as SM-112 manufactured by TECLOCK Co., Ltd. can be used. In the measurement, the glass sheet is disposed with a curved surface thereof being on a plane, and the measurement is performed with an end portion of the glass sheet sandwiched by the thickness gauge. Even when the glass sheet is flat, the measurement can be performed in the same manner as when the glass sheet is curved.

<1-2. Intermediate Film>

The intermediate film 13 is formed in at least one layer, and as one example, as illustrated in FIG. 3, it can be configured of three layers in which a soft core layer 131 is sandwiched between outer layers 132 harder than the core layer. However, the intermediate film is not limited to have this configuration, and may be formed of a plurality of layers including the core layer 131 and at least one outer layer 132 disposed on the first glass sheet 11 side. For example, the intermediate film may be a two-layer intermediate film 13 including a core layer 131 together with one outer layer 132 disposed on the first glass sheet 11 side, an intermediate film 13 in which two or more even number of outer layers 132 are disposed on each side of a core layer 131, or an intermediate film 13 in which an odd number of outer layer(s) 132 are disposed on one side and an even number of outer layers 132 are disposed on the other side with a core layer 131 interposed therebetween. In a case where only one outer layer 132 is provided, the outer layer is provided on the first glass sheet 11 side as described above, and this is in order to improve breakage resistance performance against external force from the outside of a vehicle or from outdoors. In addition, when the number of the outer layer 132 is large, an enhanced sound insulation performance is attained.

The hardness of the core layer 131 is not particularly limited as long as it is softer than the outer layer 132. The material constituting each of the layers 131 and 132 is not particularly limited, and for example, a material can be selected on the basis of Young's modulus. Specifically, the Young's modulus of the core layer 131 is preferably 1 to 20 MPa, more preferably 1 to 18 MPa, and particularly preferably 1 to 14 MPa at a frequency of 100 Hz and a temperature of 20° C. Within such a range, it is possible to prevent a decrease in the sound transmission loss (STL) in a low frequency range of approximately 3500 Hz or less. On the other hand, the Young's modulus of the outer layer 132 is preferably large in order to improve sound insulation performance in a high frequency range as described later, and can be 560 MPa or more, 600 MPa or more, 650 MPa or more, 700 MPa or more, 750 MPa or more, 880 MPa or more, or 1300 MPa or more at a frequency of 100 Hz and a temperature of 20° C. The upper limit of the Young's modulus of the outer layer 132 is not particularly limited, but can be set, for example, from the viewpoint of processability. For example, it is empirically known that when the Young's modulus of the outer layer 132 is 1750 MPa or more, processing, particularly cutting becomes difficult.

As a specific material, the outer layer 132 may be constituted of, for example, a polyvinyl butyral resin (PVB). The polyvinyl butyral resin is preferable because it is superior in adhesion to each glass sheet and penetration resistance. On the other hand, the core layer 131 may be constituted of, for example, ethylene vinyl acetate resin (EVA), or polyvinyl acetal resin that is softer than the polyvinyl butyral resin constituting the outer layer. By sandwiching the soft core layer, the sound insulation performance can be greatly improved while maintaining adhesiveness and penetration resistance which are the same as those of the single-layered resin intermediate film.

In general, the hardness of poly vinyl acetal resin can be controlled by (a) the polymerization degree of polyvinyl alcohol as a starting material, (b) the acetalization degree. (c) the type of a plasticizer. (d) the addition ratio of a plasticizer, or the like. Therefore, by appropriately adjusting at least one selected from these conditions, it is possible to prepare a hard polyvinyl butyral resin to be used for the outer layer 132 and a soft polyvinyl butyral resin to be used for the core layer 131 with distinction even with these belong to the same category of polyvinyl butyral resin. Furthermore, the hardness of the polyvinyl acetal resin can also be controlled by the type of the aldehyde to be used for acetalization, co-acetalization with a plurality of types of aldehydes, or pure acetalization with a single type of aldehyde. Although it cannot be said unconditionally, the larger the number of carbon atoms of an aldehyde to be used for the preparation of a poly vinyl acetal resin is, the softer the resulting poly vinyl acetal resin tends to be. Therefore, for example, when the outer layer 132 is constituted of a polyvinyl butyral resin, a polyvinyl acetal resin prepared by acetalizing an aldehyde having 5 or more carbon atoms (e.g. n-hexylaldehyde, 2-ethylbutyraldehyde, n-heptylaldehyde, or n-octylaldehyde) with polyvinyl alcohol may be used for the core layer 131. In addition, in a case where a prescribed Young's modulus can be obtained, the resins to be used are not limited to the above resin or the like.

The total thickness of the intermediate film 13 is not particularly limited, but is preferably 0.3 to 6.0 mm, more preferably 0.5 to 4.0 mm, and particularly preferably 0.6 to 2.0 mm. The thickness of the core layer 131 is preferably 0.1 to 2.0 mm, and more preferably 0.1 to 0.6 mm. On the other hand, the thickness of each of the outer layers 132 is preferably 0.1 to 2.0 mm, and more preferably 0.1 to 1.0 mm. In addition, the total thickness of the intermediate film 13 may be fixed, and the thickness of the core layer 131 may be adjusted therein.

The thicknesses of the core layer 131 and the outer layer 132 can be measured. for example, as follows. First, the section of the laminated glass 10 is enlarged at 175 magnifications and displayed with a microscope (for example, VH-5500 manufactured by KEYENCE CORPORATION). Then, the thicknesses of the core layer 131 and the outer layer 132 are visually specified and measured. At this time, in order to eliminate variations due to visual observation, the number of measurements is set to 5, and the average values thereof are taken as the thicknesses of the core layer 131 and the outer layer 132. For example, an enlarged photograph of a section of the laminated glass 10 is taken, and the core layer and the outer layer 132 are specified in the photograph to measure the thicknesses.

The thicknesses of the core layer 131 and the outer layer 132 of the intermediate film 13 do not need to be constant over the entire region, and for example, the intermediate film may be a wedge shape in section so as to be suited to a laminated glass to be used for a head-up display. In this case, the thicknesses of the core layer 131 and the outer layer 132 of the intermediate film 13 are measured at a place having the smallest thickness, that is, the lowermost side portion of the laminated glass 10. When the intermediate film 13 has a wedge shape, the first glass sheet and the second glass sheet are not arranged in parallel to each other, and such an arrangement shall also be included in the glass sheet in the present invention. That is, the present invention includes, for example, the arrangement of the first glass sheet and the second glass sheet when an intermediate film 13 using a core layer 131 and an outer layer 132 in which the thickness increases at a change rate of 3 mm or less per meter is used.

The method for producing the intermediate film 13 is not particularly limited, and examples thereof include a method in which a resin component such as the polyvinyl acetal resin described above, a plasticizer, and other additives as necessary are blended, uniformly kneaded, and then respective layers are collectively extruded and molded, and a method in which two or more resin films prepared by the method described above are laminated by a press method, a lamination method, or the like. The resin films before lamination to be used in the method of laminating by a press method, a lamination method or the like each may have either a single layer structure or a multilayer structure. Further, the intermediate film 13 may be formed of a plurality of layers as those described above and also may be formed of a single layer.

<2. Shielding Layer>

Next, the shielding layer 4 will be described. Since the same type of shielding layer 4 is provided on the first glass sheet 11 and the second glass sheet 12, the shielding layer 4 laminated on the second glass sheet 12 will be described below. As illustrated in FIG. 1, the shielding layer 4 includes a peripheral edge portion 41 to be laminated along the entire peripheral edge of the second glass sheet 12, and a rectangular extending portion 42 connected to the peripheral edge portion 41 and extending downward from the vicinity of the center of the upper side of the second glass sheet 12. A trapezoidal opening 43 is formed at a lower end portion of the extending portion 42, and the photographing device 2 attached to the vehicle interior side can photograph the outside of the vehicle through the opening 43 and the laminated glass 10.

The bracket described above is fixed on the shielding layer 4. Specifically, the bracket is formed in a frame shape surrounding the opening, and is fixed to the shielding layer 4 with a double-sided tape, an adhesive, or the like. The photographing device 2 is supported by the bracket, and is configured to photograph the outside of the vehicle through the opening 43. Although not illustrated, a cover is attached to the bracket such that the photographing device 2 is not seen from the vehicle interior side.

Next, the material of the shielding layer 4 will be described. The material of the shielding layer 4 may be appropriately chosen according to the embodiment as long as it can shield the visual field from the outside of a vehicle, and for example, a ceramic with a dark color such as black, brown, gray, or deep blue may be used.

When a black ceramic is chosen as the material of the shielding layer 4, for example, the black ceramic is laminated on the inner surface of the second glass sheet 12 and the inner surface of the first glass sheet 11 by screen printing or the like, and the laminated ceramics are heated together with the glass sheets 11 and 12. When the ceramics are cured, the shielding layers 4 are completed. As the ceramic to be used for each shielding layer 4, various materials can be used. For example, a ceramic having the composition given in the following Table I can be used for a shielding layer 4.

TABLE 1

| | | First and second colored ceramic pastes |
|---|---|---|
| Pigment *1 | % by mass | 10 |
| Resin (Cellulose resin) | % by mass | 10 |
| Organic solvent (Pine oil) | % by mass | 10 |
| Glass binder *2 | % by mass | 70 |
| Viscosity | dPs | 150 |

*1, Main components: copper oxide, chromium oxide, iron oxide, and manganese oxide
*2, Main components: bismuth borosilicate and zinc borosilicate In the present embodiment, as illustrated in FIG. 1, in the peripheral edge portion 41 of the shielding layer 4, the thickness of a portion (partial region) 411 along the lower side of the second glass sheet 12 is larger than the thickness of the other portion (other region). For example, the thicknesses of these portions are not particularly limited, and for example, the thickness of a portion along the lower side may be 20 μm or more, and the thickness of the other portion may be 10 to 15 μm.

<3. Method for Manufacturing Windshield>

Next, a method of manufacturing a windshield will be described. First, a shielding layer 4 is laminated on a first glass sheet 11 and a second glass sheet 12 formed in a prescribed shape. Subsequently, the glass sheets 11 and 12 are formed so as to be curved toward a vehicle exterior side. The method for this is not particularly limited, but this can be performed by, for example, known press molding. Alternatively, the first glass sheet 11 and the second glass sheet 12 are stacked on a molding die, and then the molding die is heated by being passed through a heating furnace. As a result, these glass sheets 11 and 12 can be curved by their own weight.

When the first glass sheet 11 and the second glass sheet 12 are molded in this way, subsequently, a laminate in which the intermediate film 13 is sandwiched between the first glass sheet 11 and the second glass sheet 12 is formed. The intermediate film 13 has a shape larger than those of the glass sheets 11 and 12.

Next, the laminate is placed into a rubber bag and subjected to preliminary bonding at about 70 to 110° C. while being decompressed and suctioned. The method of preliminary bonding may be other than this, and the following method may also be adopted. For example, the laminate is heated in an oven at 45 to 65° C. Next, the laminate is pressed by a roll at 0.45 to 0.55 MPa. Subsequently, the laminate is heated again in the oven at 80 to 105° C. and then is pressed again by a roll at 0.45 to 0.55 MPa. In this way, the preliminary bonding is completed.

Next, permanent bonding is performed. The preliminarily bonded laminate is subjected to permanent bonding using an autoclave at, for example, 8 to 15 atm and at 100 to 150° C. Specifically, for example, the permanent bonding can be performed under the conditions of 14 atm and 135° C. Through the preliminary bonding and the permanent bonding described above, the intermediate film 13 is bonded to each of the glass sheets 11 and 12. Subsequently, the intermediate film 13 that protrudes out of the first glass sheet 11 and the second glass sheet 12 is cut.

<4. Features>

The windshield described above can afford the following effects. As described above, it has been found that when the thickness of the portion 411 of the shielding layer 4 disposed on the lower side of the second glass sheet 12 is larger than the thickness of the other portion, the fracture stress of this portion 411 is smaller than that of the other portion. This point will be described later. As a result of the configuration described above, for example, when a collision accident with a pedestrian occurs and the pedestrian collides with the windshield from the outside of the vehicle, the laminated glass 10 can be easily cracked. As a result, the time for which an impact is applied from the laminated glass 10 to the pedestrian can be shortened, and the impact applied to the person who has collided can be reduced.

Describing this mechanism in more detail, when a person collides with the laminated glass 10 from the outside of the vehicle, the laminated glass 10 is deformed so as to be convex toward the vehicle interior side. As a result, tensile stress acts on the second glass sheet 12, and cracking occurs from the vicinity of the thick shielding layer 4 where the fracture stress is low, and the second glass sheet 12 breaks. As a result, the thickness of the laminated glass 10 is reduced to about a half, so that the rigidity of the entire laminated glass 10 is reduced to about ¼, and the entire laminated glass 10 is more easily cracked, and is broken. In particular, since the vicinity of the lower side of the laminated glass 10 easily collides with a pedestrian carried upon a hood, when the fracture stress of this portion is low, the second glass sheet 12 is more easily broken.

Figure 4:
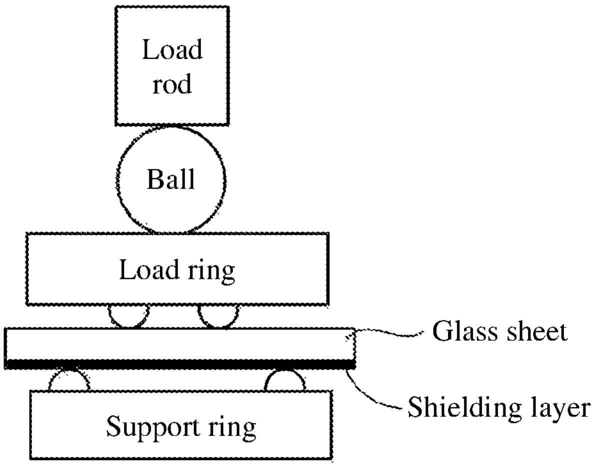
FIG. 4 is a schematic diagram illustrating an example of a method for measuring fracture stress.

As described above, according to the study of the present inventors on the thickness of the shielding layer 4, it has been found that the fracture stress of the glass sheet decreases as the thickness of the shielding layer 4 increases. This point was evaluated as follows. First, a plurality of glass sheets having a thickness of 2 mm and a size of 100 mm×100 mm were prepared, and shielding layers differing in thickness were formed on these glass sheets. Then, these glass sheets were subjected to a ring flexural strength test in accordance with ASTM C 1499 and DIN EN 1288 as illustrated in FIG. 4. In this test, a glass sheet having a shielding layer formed on the lower side was disposed on a support ring having a diameter of 40 mm, and a load ring having a diameter of 20 mm was disposed thereon. Then, a ball disposed on the load ring was pressed with a load rod at 1 MPa/s, and the fracture stress when the glass sheet was broken was measured. The result is as shown in FIG. 5.

Figure 5:
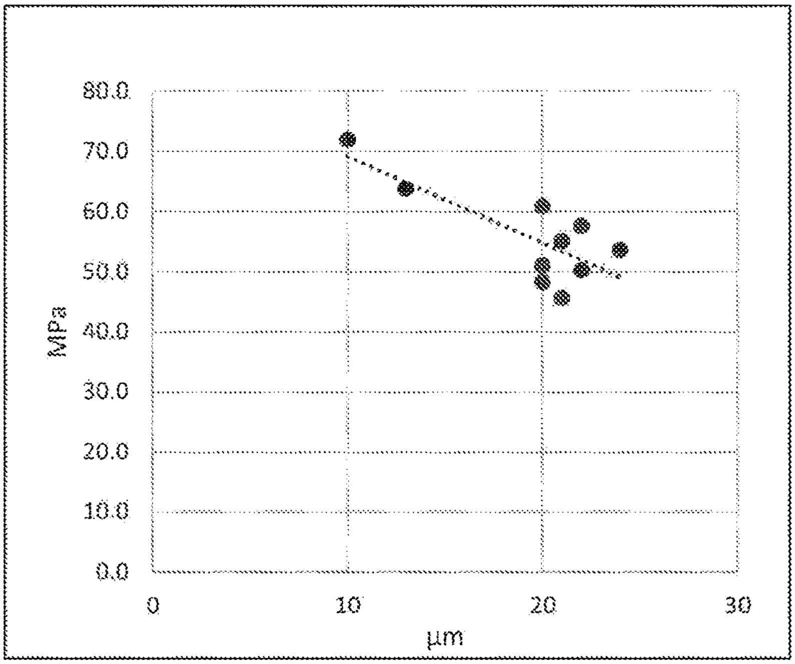
FIG. 5 is a graph showing a relationship between a thickness of a shielding layer and fracture stress.

As shown in FIG. 5, it can be seen that the fracture stress decreases as the thickness of the shielding layer 4 increases. In particular, it can be seen that the fracture stress of the glass sheet in which the thickness of the shielding layer 4 is 20 μm or more is lower by 10 MPa or more than that of the glass sheet in which the thickness of the shielding layer 4 is 10 μm. As described above, in the second glass sheet 12, since the place where the thickness of the shielding layer 4 is large is more easily cracked than other places, cracking of the second glass sheet 12 is more likely to be induced when the collision occurs as described above, so that the impact received by the person who has collided can be reduced. The fracture stress at the place where the thickness of the shielding layer 4 is large is preferably 90% or less, and more preferably 80% or less, of that of the other places. However, when the fracture stress is excessively low, the overall rigidity is lowered, and therefore 35% or more is preferable, of that of the other places. In addition, the fracture stress at the place where the thickness of the shielding layer 4 is large is preferably 60 MPa or less.

5. Modification Examples

The embodiment of the present invention has been described above, but the present invention is not limited to the above embodiment, and various modifications can be carried out without departing from the gist of the invention. Note that the following modification examples can be appropriately combined.

<5->

In the embodiment described above, the portion having a large thickness of the shielding layer 4 is formed along the lower side of the second glass sheet 12, but the place having a large thickness is not limited thereto, and may be formed in another portion of the second glass sheet 12. In addition, a portion having a large thickness of the shielding layer 4 may be formed not only along the lower side but also along a lateral side. However, a place where the fracture stress is small is preferably near a place where the pedestrian is likely to collide, and as described above, a place facing the rear end portion of the engine hood or a place facing the cowl louver is preferable.

<5-2>

When the shielding layer 4 is formed on both the first glass sheet 11 and the second glass sheet 12, the thickness of the shielding layer 4 of the second glass sheet 12 may be made constant and larger than the thickness of the shielding layer 4 of the first glass sheet 11. Owing to this configuration, as compared with the first glass sheet 11, the portion of the second glass sheet 12 where the shielding layer 4 is provided can be made easier to crack. Note that the shielding layer 4 may also be formed only on the second glass sheet 12. In addition, the shape of the shielding layer 4 is not particularly limited, and may be appropriately changed.

<5-3>

Figure 6A:
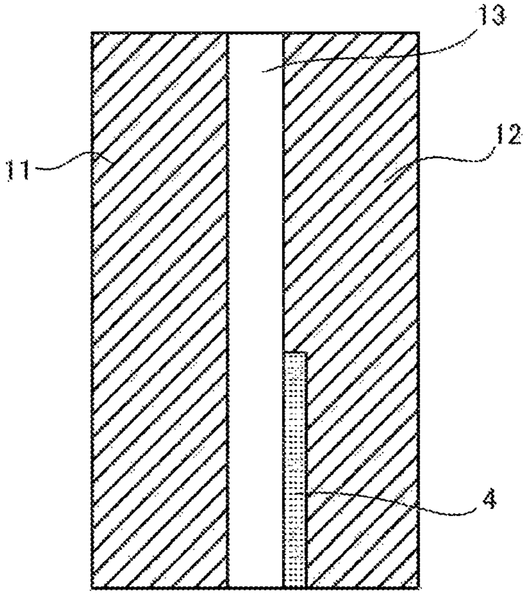
FIG. 6A is a sectional view illustrating another example of the position of a shielding layer.
Figure 6B:
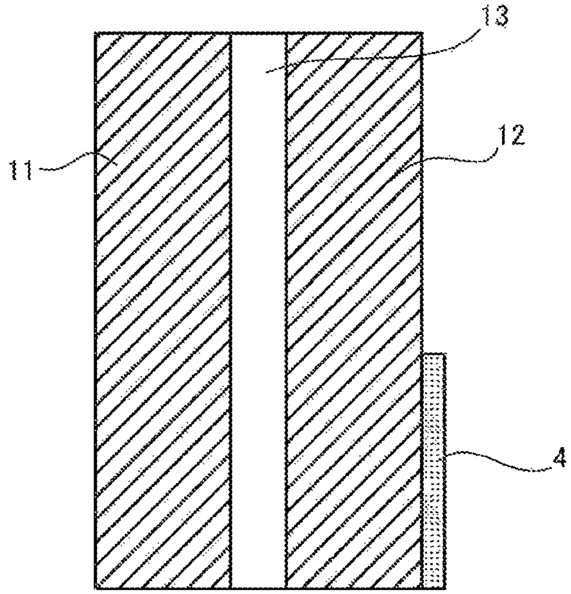
FIG. 6B is a sectional view illustrating another example of the position of a shielding layer.
Figure 6C:
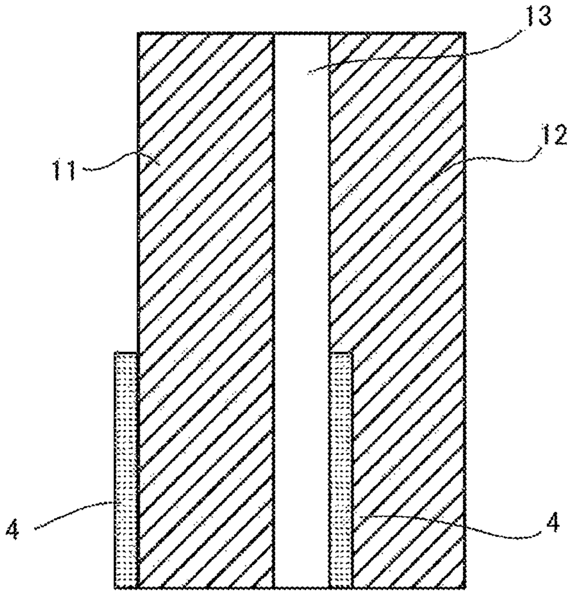
FIG. 6C is a sectional view illustrating another example of the position of a shielding layer.
Figure 6D:
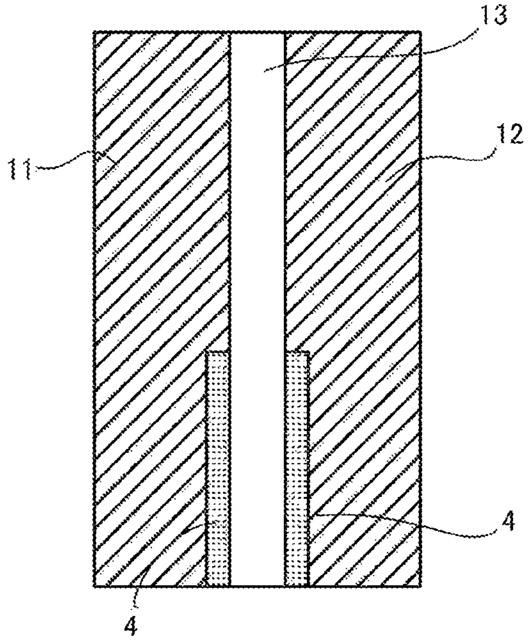
FIG. 6D is a sectional view illustrating another example of the position of a shielding layer.
Figure 6E:
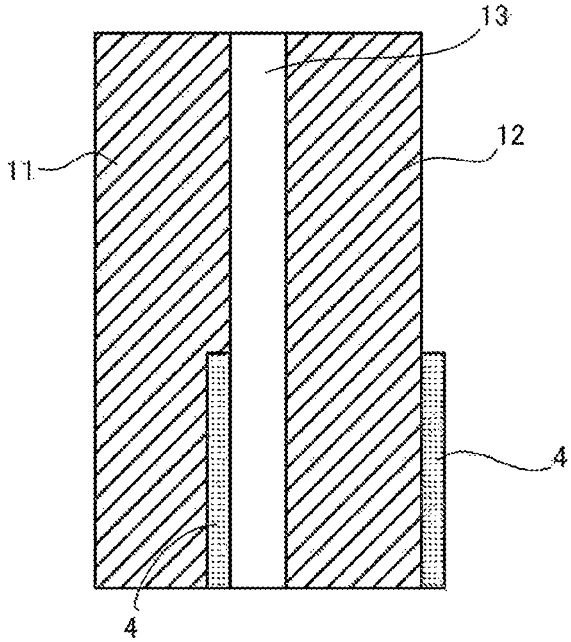
FIG. 6E is a sectional view illustrating another example of the position of a shielding layer.
Figure 6F:
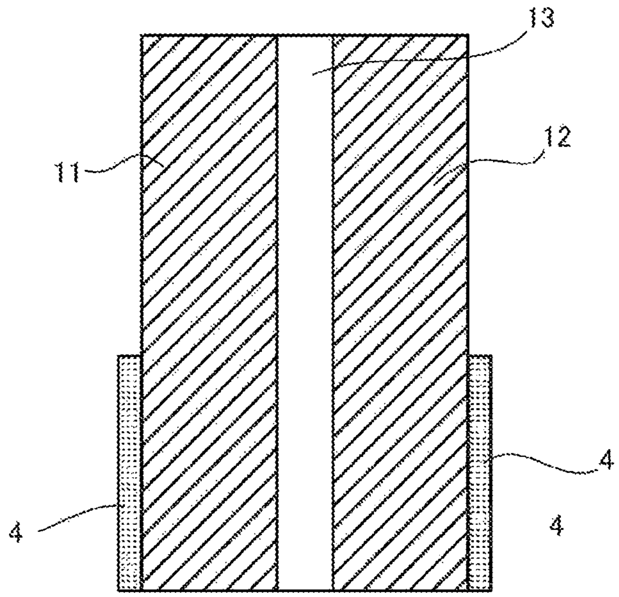
FIG. 6F is a sectional view illustrating another example of the position of a shielding layer.

In the embodiment described above, the shielding layer 4 is disposed on the surface of the first glass sheet 11 on the vehicle interior side and the surface of the second glass sheet 12 on the vehicle interior side, but the present invention is not limited thereto. For example, as illustrated in FIG. 6A, the shielding layer 4 may be disposed only on a surface (third surface) of the second glass sheet 12 on the vehicle exterior side, or as illustrated in FIG. 6B, the shielding layer 4 may be disposed only on a surface (fourth surface) of the second glass sheet 12 on the vehicle interior side. As illustrated in FIG. 6C, the shielding layer 4 may be disposed on a surface (first surface) of the first glass sheet 11 on the vehicle exterior side and a surface (third surface) of the second glass sheet 12 on the vehicle exterior side. Alternatively, as illustrated in FIG. 6D, the shielding layer 4 may be disposed on a surface (second surface) of the first glass sheet 11 on the vehicle interior side and a surface (third surface) of the second glass sheet 12 on the vehicle exterior side. Alternatively, as illustrated in FIG. 6E, the shielding layer 4 may be disposed on a surface (second surface) of the first glass sheet 11 on the vehicle interior side and a surface (fourth surface) of the second glass sheet 12 on the vehicle interior side. Furthermore, alternatively, as illustrated in FIG. 6F, the shielding layer 4 may be disposed on a surface (first surface) of the first glass sheet 11 on the vehicle exterior side and a surface (fourth surface) of the second glass sheet 12 on the vehicle interior side.

The examples illustrated in FIGS. 6A to 6F are merely examples of the position of the shielding layer 4, and the shape of the shielding layer is not particularly limited as described above.

<5-4>

In the embodiment described above, by making the thickness of the shielding layer 4 large, the fracture stress of the second glass sheet 12 at this portion is reduced. However, the means for reducing the fracture stress of the second glass sheet 12 (easily breaking means) is not limited thereto, and various means may be applied.

<5-5>

In order to reduce the fracture stress of the second glass sheet 12, a partial region of the second glass sheet 12 is altered by a laser, so that the fracture stress of this portion can be reduced. For example, a prescribed place of the shielding layer 4 is irradiated with a laser beam having a wavelength of 1064 nm so as to have a diameter of about 0.5 mm. The output of the laser may be set to such an extent that a part of the surface of the shielding layer 4 is exfoliated and the second glass sheet 12 below the shielding layer 4 becomes fragile. When laser irradiation is performed in this way, cracks are generated in the second glass sheet 12 below the laser irradiation. As a result, it is possible to reduce the fracture stress at the place irradiated with the laser.

<5-6>

In order to reduce the fracture stress of the second glass sheet 12, the surface roughness of a partial region of the second glass sheet 12 may be made larger than that of the other regions. This also makes it possible to reduce the fracture stress at a place where the surface roughness is large. For example, the surface roughness Rz of a partial region can be made 20 μm or more. Note that the position and size of such a place having large surface roughness are not particularly limited, and for example, the portion may be formed linearly along the lower side of the second glass sheet 12, or a plurality of places having large surface roughness may be arranged along the lower side.

<5-7>

In the laminated glass 10, the fracture stress can be reduced by forming a through hole or by providing no intermediate film 13 in a portion where the fracture stress is to be reduced.

<5-8>

A striking member such as a grain having a sharp protrusion toward the second glass sheet 12 may be disposed in a prescribed region (striking region) of the intermediate film 13. Owing to this configuration, when a person collides with the laminated glass 10 from the outside of the vehicle, the protrusion of the grain hits the second glass sheet 12 and can break the second glass sheet 12.

<5-9>

When the second glass sheet 12 is molded, the cooling temperature of a portion where the fracture stress is to be reduced may be made lower than that of the other portion. Owing to this configuration, the cooling time of this portion becomes longer, and the fracture stress can be reduced. In this manner, for example, the cooling temperature at a prescribed place of the molding die can be made lower than that at other places of the molding die.

<5-10>

In the embodiment described above, the glass sheet disposed on the vehicle exterior side of the laminated glass is described as the first glass sheet 11, and the glass sheet disposed on the vehicle exterior side is described as the second glass sheet 12, but these may be reversed. That is, the above-described first glass sheet 11 may be disposed on the vehicle interior side, and the second glass sheet 12 may be disposed on the vehicle exterior side.

DESCRIPTION OF REFERENCE SIGNS

11: First glass sheet
12: Second glass sheet
13: Intermediate film
4: Shielding layer

The invention claimed is:

1. A windshield comprising:

a first glass sheet having a first surface and a second surface;

a second glass sheet having a third surface and a fourth surface;

an intermediate film disposed between the first glass sheet and the second glass sheet and joining the second surface of the first glass sheet and the third surface of the second glass sheet to each other; and a shielding layer laminated on at least the second glass sheet;

wherein the second glass sheet includes a partial region and a region other than the partial region, a fracture stress of at least the partial region of the second glass sheet is smaller than a fracture stress of the region other than the partial region, a thickness of the shielding layer laminated on the partial region is larger than a thickness of the shielding layer laminated on the region other than the partial region, the thickness of the shielding layer laminated on the partial region is 20 μm or more, and the thickness of the shielding layer laminated on the region other than the partial region is 10 μm to 15 μm.

2. The windshield according to claim 1, wherein an easily breaking means is provided in the partial region.

3. The windshield according to claim 2, wherein the easily breaking means is provided on the fourth surface.

4. The windshield according to claim 2, wherein the first glass sheet is not provided with the easily breaking means.

5. The windshield according to claim 1, wherein the windshield is provided behind an engine hood of a vehicle, and the partial region faces the engine hood.

6. The windshield according to claim 1, wherein the windshield is provided behind a cowl louver, and the partial region faces the cowl louver.

7. The windshield according to claim 1, further comprising shielding layers laminated on the first glass sheet and the second glass sheet, respectively, wherein the region other than the partial region is provided in the first glass sheet, and a thickness of the shielding layer laminated on the second glass sheet is larger than a thickness of the shielding layer laminated on the first glass sheet.

8. The windshield according to claim 1, wherein the fracture stress in the partial region is 60 MPa or less.

9. The windshield according to claim 1, wherein the partial region is altered by a laser.

10. The windshield according to claim 1, wherein a surface roughness of the partial region is larger than a surface roughness of the region other than the partial region.

11. The windshield according to claim 1, wherein the intermediate film is not disposed between the first glass sheet and the second glass sheet at a place corresponding to the partial region.

12. The windshield according to claim 1, wherein the intermediate film has a striking region at a place corresponding to the partial region, and the striking region is provided with a striking member that crushes the second glass sheet.

13. The windshield according to claim 1, wherein the shielding layer is laminated on at least one of the third surface and the fourth surface of the second glass sheet.

14. The windshield according to claim 7, wherein the shielding layers are laminated on at least one of the first surface and the second surface of the first glass sheet.

15. The windshield according to claim 7, wherein the shielding layer is laminated on at least one of the third surface and the fourth surface of the second glass sheet.

16. The windshield according to claim 1, wherein the first glass sheet has a thickness of 1 mm or more and 4 mm or less.

17. The windshield according to claim 1, wherein the second glass sheet has a thickness of 0.4 mm or more and 4 mm or less.

18. The windshield according to claim 1, wherein the first glass sheet is a glass sheet to be disposed on a vehicle exterior side, and the second glass sheet is a glass sheet to be disposed on a vehicle interior side.

19. The windshield according to claim 1, wherein the first glass sheet is a glass sheet to be disposed on a vehicle interior side, and the second glass sheet is a glass sheet to be disposed on a vehicle exterior side.

* * * * *